United States Patent
He et al.

(10) Patent No.: US 10,103,548 B2
(45) Date of Patent: Oct. 16, 2018

(54) OPERATING A SOLAR POWER GENERATING SYSTEM

(71) Applicant: FUJITSU LIMITED, Kawasaki-shi, Kanagawa (JP)

(72) Inventors: Dawei He, San Jose, CA (US); Shahrouz Alimohammadi, West Hills, CA (US)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 14/921,988

(22) Filed: Oct. 23, 2015

(65) Prior Publication Data

US 2017/0117711 A1    Apr. 27, 2017

(51) Int. Cl.
| | |
|---|---|
| *H02J 3/38* | (2006.01) |
| *H02S 50/10* | (2014.01) |
| *G05B 15/02* | (2006.01) |
| *G06N 7/00* | (2006.01) |
| *H02J 3/00* | (2006.01) |

(52) U.S. Cl.
CPC ............ *H02J 3/383* (2013.01); *G05B 15/02* (2013.01); *G06N 7/005* (2013.01); *H02J 3/381* (2013.01); *H02J 3/382* (2013.01); *H02J 3/386* (2013.01); *H02S 50/10* (2014.12); *H02J 2003/003* (2013.01); *Y02E 10/563* (2013.01); *Y02E 10/763* (2013.01); *Y04S 10/54* (2013.01)

(58) Field of Classification Search
CPC ...... H02J 3/383; H02J 3/386; H02J 2003/003; H02S 50/10; G05B 15/02; G06N 7/005
USPC .......................................................... 307/43
See application file for complete search history.

(56) References Cited

U.S. PATENT DOCUMENTS

| | | | |
|---|---|---|---|
| 9,300,141 B2* | 3/2016 | Marhoefer | H02J 3/32 |
| 2013/0054662 A1* | 2/2013 | Coimbra | G06F 17/18 |
| | | | 708/230 |
| 2014/0278107 A1* | 9/2014 | Kerrigan | G01W 1/10 |
| | | | 702/3 |

OTHER PUBLICATIONS

Jones, Donald R. "A taxonomy of global optimization methods based on response surfaces." Journal of global optimization21, No. 4 (2001): 345-383.

Ineichen, Pierre, and Richard Perez. "A new airmass independent formulation for the Linke turbidity coefficient." Solar Energy73, No. 3 (Jun. 2, 2002): 151-157.

(Continued)

*Primary Examiner* — Dinh T Le
(74) *Attorney, Agent, or Firm* — Maschoff Brennan

(57) ABSTRACT

According to some embodiments, the present disclosure may include a method of analyzing solar power forecasts that may include obtaining a test dataset of historical irradiance at a location of a solar power generating system, and normalizing the test dataset based on a clear sky model at the location. The method may also include clustering the test dataset into multiple weather classes that each include a set of characteristics, obtaining a forecast of irradiance at the solar power generating system, and classifying the forecast into one of the weather classes, and determining confidence intervals of the forecast based on the set of characteristics of the one of the plurality of weather classes. The method may additionally include, based on the confidence intervals of the forecast, performing one of increasing output or decreasing output of a source of energy alternative to solar energy.

18 Claims, 5 Drawing Sheets

(56) References Cited

OTHER PUBLICATIONS

Marquez, Ricardo, and Carlos FM Coimbra. "Forecasting of global and direct solar irradiance using stochastic learning methods, ground experiments and the NWS database." Solar Energy 85, No. 5 (Jan. 19, 2011): 746-756.
Chow, Chi Wai, et al., "Intra-hour forecasting with a total sky imager at the UC San Diego solar energy testbed." Solar Energy85, No. 11 (Aug. 19, 2011): 2881-2893.
Mathiesen, Patrick, et al., "Geostrophic wind dependent probabilistic irradiance forecasts for coastal California." Sustainable Energy, IEEE Transactions on4, No. 2 (Apr. 2, 2013): 510-518.
Alessandrini, S., et al., "An analog ensemble for short-term probabilistic solar power forecast." Applied Energy157 (Aug. 5, 2015): 95-110.
Pedro, Hugo TC, and Carlos FM Coimbra. "Nearest-neighbor methodology for prediction of intra-hour global horizontal and direct normal irradiances." Renewable Energy 80 (Feb. 25, 2015): 770-782.
Bessa, R. J., et al., "Probabilistic solar power forecasting in smart grids using distributed information." International Journal of Electrical Power & Energy Systems72 (Feb. 16, 2015): 16-23.
Pattern Search (optimization), Wikipedia, Retreived from <https://en.wikipedia.org/wiki/Pattern_search_(optimization)>, retrieved on Oct. 13, 2015.

\* cited by examiner

1

OPERATING A SOLAR POWER GENERATING SYSTEM

FIELD

One or more embodiments discussed in the present disclosure relate to operating a solar power generating system.

BACKGROUND

There are many efforts throughout the world to reduce greenhouse emissions. Efforts may range from hybrid vehicles to energy efficient light bulbs. One avenue of efforts is associated with the generation of electrical power and greenhouse emissions associated with various types of electrical power generation. One source of electrical power that has received attention is solar power because it is renewable and does not burn fossil fuels. However, the effectiveness of solar power generation can be greatly affected by weather experienced at a location generating solar power.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of operating a solar power generating system that includes obtaining a test dataset of historical irradiance at a location of the solar power generating system, and normalizing the test dataset based on a clear sky model of irradiance at the location such that the normalized dataset is independent of solar zenith angle. The method may also include clustering the test dataset into a multiple weather classes that each include a set of characteristics. The method may additionally include obtaining a forecast of irradiance for a given future time at the solar power generating system and classifying the forecast into one of the weather classes. The method may further include determining confidence intervals of the forecast based on the set of characteristics of the one of the plurality of weather classes. The method may also include, based on the confidence intervals of the forecast, performing one of increasing output of a source of energy alternative to solar energy or decreasing output of the source of energy.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Solar power is a source of electrical power that is dependent on the amount of sunlight to which a photovoltaic cell is exposed. For this reason, electricity producers, such as managers and operators of virtual power plants (VPP) utilize forecasts of irradiance (e.g., the flux of radiant energy per unit area) to predict the amount of electricity that a solar power producing device may generate. However, such forecasts are not always accurate, and may not account for an expected variability of the forecast.

The present disclosure may relate to operating a solar power generating system by utilizing information indicative of the accuracy of a forecast of irradiance. A test dataset of historical irradiance may be obtained, for example, the irradiance experienced by a given location for a number of days in various seasons and various weather conditions. The test dataset may be normalized based on a clear sky model of irradiance, for example, by dividing the irradiance at a point in time in the test dataset with the clear sky irradiance for that time of day. After being normalized, the test dataset may be clustered into weather classes (e.g. clear sky, partly cloudy, or overcast) with a set of associated characteristics. Such actions may create a framework for analyzing the accuracy of a forecast. A forecast of irradiance to be analyzed within the framework may be obtained, for example, from a third party predictive service. The forecast may then be classified into one of the weather classes. Based on the characteristics of the weather class, confidence intervals for the forecast may be determined. The confidence intervals may indicate the reliability of the forecast. The operation of the solar power generating system may be modified based on the confidence intervals. For example, if a confidence interval is high, the output of an alternative energy source besides solar power may be increased to compensate for a potential deficiency in power.

Embodiments of the present disclosure are explained with reference to the accompanying drawings.

Figure 1:
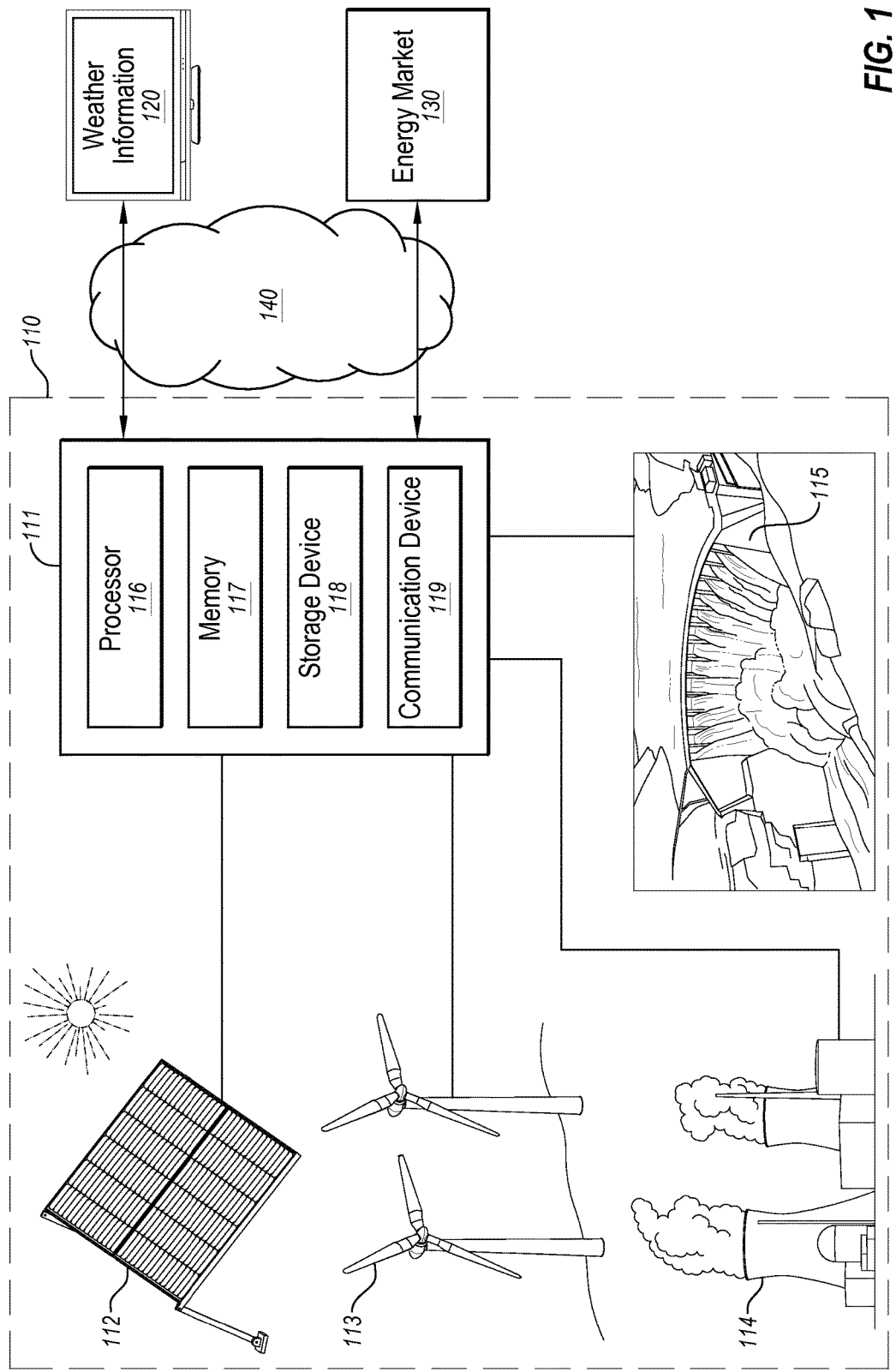
FIG. 1 is a diagram representing an example system configured to operate a virtual power plant including a solar power generating device.

FIG. 1 is a diagram representing an example system 100 configured to operate a virtual power plant (VPP) 110 including a solar power generating device 112. The system 100 may include the VPP 110, a weather information source 120, an energy market 130, and a network 140. The VPP 110 may include a control device 111 and one or more sources of generating electrical power. For example, as illustrated in FIG. 1, the VPP 110 may include a solar power generating device 112, a wind power generating device 113, a fossil fuel power generating device 114, and a hydro power generating device 115.

The control device 111 may include any device, system, component, or collection of components configured to manage the operation of the VPP 110. For example, the control device 111 may generate or analyze forecasts associated with solar power generation at the solar power generating device 112. As another example, the control device 111 may regulate or modify the amount of power being generated by one or more of the sources that generate electrical power. The control device 111 may also perform an analysis on weather information, such as weather information received from the weather information source 120.

The weather information source 120 may be any device, system, component, or collection of components configured to store, generate, predict, or otherwise handle weather information. Weather information at the weather information source 120 may include any weather information, including, for example, irradiance, cloud cover, cloud formation, cloud class, sky cover (e.g., the percentage of the sky covered with clouds), hours of sun shine, season (e.g., winter, summer), daily maximum temperature, daily minimum temperature, dew point temperature, temperature, relative humidity, wind speed, wind direction, daily probability of precipitation, solar azimuth angle, solar zenith angle, normalized hour angle, etc.

Weather information at the weather information source 120 may be available from any source, such as an almanac, a weather forecasting service, a news station, a database of physical observations, a web service, etc. In some embodiments, the weather information may be characterized as a data triad of a time (which may include any of the day, hour, minute, or second), a location, and associated data. For example, a data triad may include Jul. 4, 2015 at 10 AM at San Francisco, Cali. and may have corresponding weather information such as daily high of eighty-five degrees, ten percent sky cover, summer, and ten percent chance of rain. The weather information source 120 may include historical data for a variety of locations, such as the location of the solar power generating device 112. The weather information source 120 may also include forecasts, projections, or other forward looking information regarding weather. In some embodiments, weather information such as historical data or forecasts of weather information may be communicated from the weather information source 120 to the control device 111 via the network 140. In some embodiments, the control device 111 may generate a forecast of weather information.

The energy market 130 may be any system or collection of systems where electrical power may be purchased or sold. For example, the control device 111 may provide some portion of the electrical power generated at the VPP 110 to the energy market 130. Additionally or alternatively, the control device 111 may acquire or purchase additional energy from the energy market 130 for distribution to one or more subscribers that receive electrical power from the VPP 110. In some embodiments, electrical power may be reserved or otherwise provisionally purchased via the energy market 130.

The network 140 may include any device, system, component, or combination thereof configured to provide communication between one or more of the control device 111, the weather information source 120, and the energy market 130. The communication may include not only informational communication, but may also include other types of communication, for example, communication of electrical power. By way of example, the network 140 may include one or more wide area networks (WANs), local area networks (LANs), electrical distribution networks, power-line networks, etc., that enable the control device 111, the weather information source 120, and/or the energy market 130 to be in communication. In some embodiments, the network 140 may include the Internet, including a global internetwork formed by logical and physical connections between multiple WANs and/or LANs. Alternately or additionally, the network 140 may include one or more cellular RF networks and/or one or more wired and/or wireless networks such as, but not limited to, 802.xx networks, Bluetooth® access points, wireless access points, IP-based networks, or the like. The network 140 may also include servers, substations, or other connection devices that enable one type of network to interface with another type of network. Additionally or alternatively, the network 140 may include an Intranet, or one or more computing devices in communication within an organization or an in otherwise secure manner.

In some embodiments, the solar power generating device 112, the wind power generating device 113, the fossil fuel power generating device 114, and/or the hydro power generating device 115 may be in communication with the control device 111 via the network 140. Additionally or alternatively, the solar power generating device 112, the wind power generating device 113, the fossil fuel power generating device 114, and/or the hydro power generating device 115 may be electrically in communication with a system for storing, distributing, selling, conditioning, or otherwise handling or controlling the generated power. In these and other embodiments, the control device 111 may be part of and/or may direct or control such a system.

In operation, the control device 111 may perform any of the operations described in the present disclosure. For example, the control device 111 may obtain a test dataset of historical weather information regarding the location of the solar power generating device 112 from the weather information source 120 via the network 140. The weather information of the test dataset may include historical irradiance data. The control device 111 may use the historical irradiance data and a clear sky model of irradiance to normalize the historical irradiance data. For example, for a data point in the test dataset corresponding to a given time of day, the historical irradiance data for the data point may be divided by the clear sky irradiance for that time of day. After being normalized, the test dataset may be independent of the time of day or independent of the solar zenith angle. The normalized value may be referred to as the clear sky index.

Based on the normalized irradiance data (e.g., the clear sky indexes of the test dataset), the test dataset may be clustered into weather classes. Some examples of weather classes may include clear, overcast, or partly cloudy. Each class may have a corresponding set of characteristics, which may include any of the weather information described as being at the weather information source 120. For example, the weather class of clear may have high irradiance and high daily temperature and low daily precipitation chances. The set of characteristics may also include a degree of unpredictability of irradiance. For example, an overcast or partly cloudy weather class may have a higher degree of unpredictability of irradiance than a clear class. One example of clustering the test dataset into weather classes may be illustrated and described with reference to FIG. 2. In some embodiments, the test dataset may also be clustered based on a solar zenith angle (e.g. low solar zenith angle for up to approximately two hours after sunrise and up to approximately two hours before sunset, and a high solar zenith angle for approximately two hours after sunrise until approximately two hours before sunset). While two hours is used as an example, it will be appreciated that this value may also change depending on a variety of factors, including elevation, surrounding mountains or other terrain, or other factors that may increase or decrease the amount of solar energy production. For example, the approximate time may also include a half of an hour, one hour, or an hour and a half. In these and other embodiments, the clustering based on solar zenith angle may be a sub-class within the weather class. For example, data points within the morning hours of the test dataset may be clustered in one sub-class and data points within the evening hours of the test dataset may be clustered in another sub-class. For example, during times of low solar zenith angle, ground obstacles (e.g., trees) may create an increase in variability when compared to data points with a high solar zenith angle. In addition to ground obstacles, geographic location may also effect the variability of the low solar zenith angle sub-classes. For example, in California, marine layer clouds in the mornings may cover much of the sky while in the evening, marine clouds may have dissipated to a larger extent than the morning hours.

Figure 2:
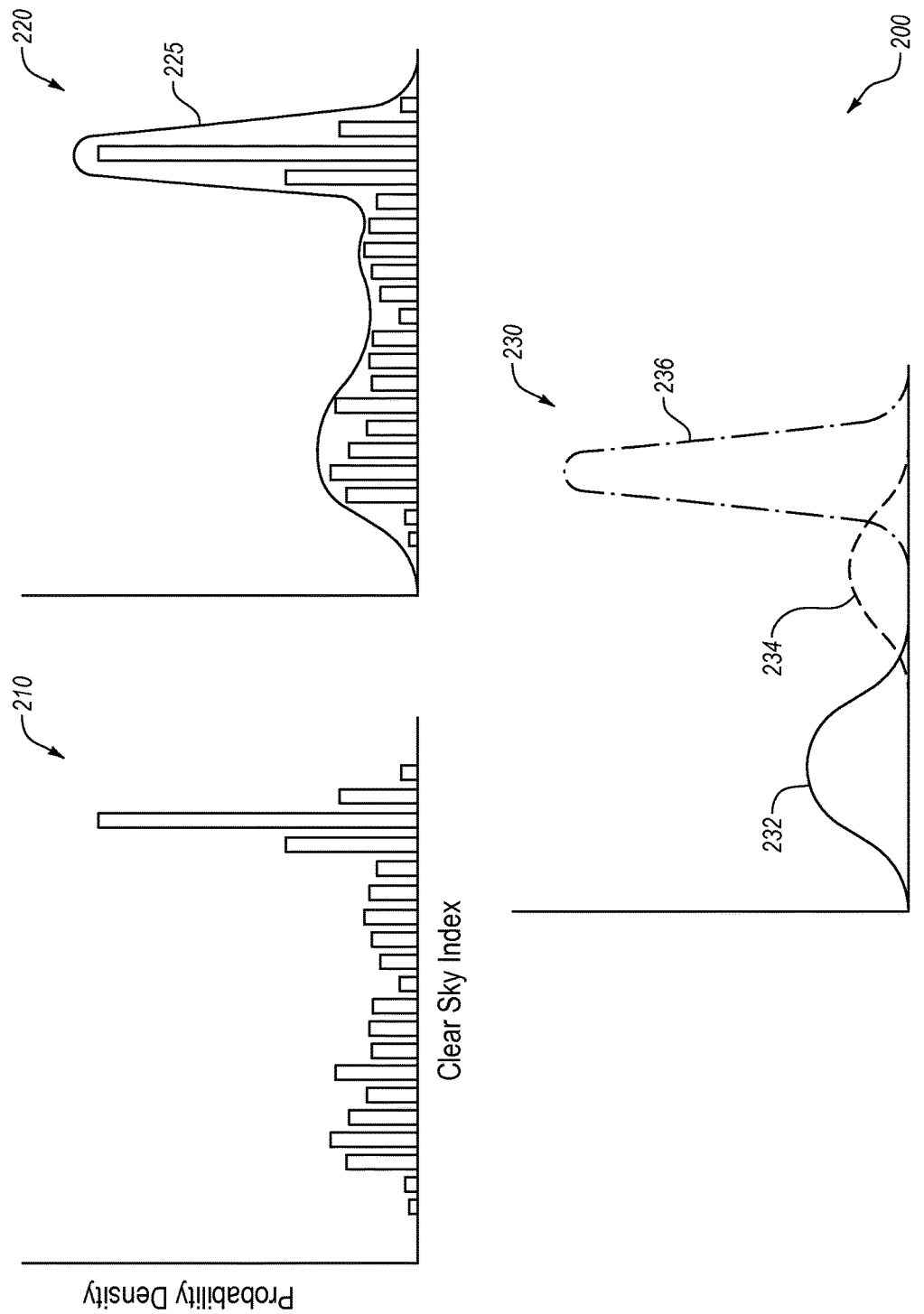
FIG. 2 is a set of example plots used in evaluating a solar power forecast.

FIG. 2 is a set of example plots 200 used in evaluating a solar power forecast. For example, the set of example plots 200 may be used to cluster a normalized test dataset into weather classes. A plot 210 may include a histogram of the normalized test dataset. The histogram may depict the probability density of a given clear sky index. For example, for a given clear sky index, each data point in the normalized test dataset corresponding to that clear sky index may be aggregated such that the percentage of total data points corresponding to the given clear sky index may be plotted in the histogram on the plot 210. In these and other embodiments, data points with a low solar zenith angle may be classified in one or more sub-classes with a separate histogram.

The example set of plots 200 may also include a plot 220 illustrating a curve 225 fit to the histogram. The curve 225 may represent a combination of curves, where each of the curves in the combination may represent a separate and distinct weather class. For example, such a combination of curves may represent a Gaussian mixture model. In some embodiments, each of the curves may be separated into distinct curves from the combined curve 225. For example, a plot 230 may illustrate the separate curves, such as a first curve 232, a second curve 234, and a third curve 236. The first curve 232 may represent an overcast weather class. As illustrated in the plot 230, the first curve 232 may have a broader range of unpredictability than the third curve 236 as the probability distribution is more spread out. Similarly, the second curve 234 may represent a partly cloudy weather class, and may have a broader range of unpredictability than the third curve 236. As illustrated in the plot 230, the first curve 232 may have a generally lower clear sky index than the second curve 234. The third curve 236 may represent a clear weather class. The clear weather class may have the highest clear sky index relative to the other weather classes, and may have a more narrow distribution curve, or a lower degree of unpredictability when compared to the other two weather classes. In some embodiments, the curve 225 of the plot 220 may represent a Gaussian mixture model such that each class may be modeled by a Gaussian distribution model. In these and other embodiments, the first, second, and third curves 232, 234, and 236 may each represent a Gaussian distribution.

In some embodiments, each data point in the normalized test dataset may be clustered with a particular weather class by determining which of the class-specific curves the data point most closely matches. By so doing, a framework may be established against which new forecasts may be analyzed.

Modifications, additions, and omissions may be made to the example set of plots 200 of FIG. 2 without departing from the essence of the present disclosure. For example, any number of weather classes may be used, and there may be a corresponding curve for each of the weather classes in the plot 230. Additionally, the example plots 200 are provided for illustrative purposes, and embodiments of the present disclosure may be implemented without generating the example set of plots 200.

Returning to FIG. 1, after a framework for analyzing forecasts may be established, a new forecast may be obtained, for example, a forecast of irradiance. Such a forecast may be received from the weather information source 120 at the control device 111 or may be generated by the control device 111. The control device 111 may analyze the new forecast to determine the accuracy of the new forecast, or the degree of unpredictability of the new forecast.

In some embodiments, a nearest neighbor of the new forecast may be found in the test dataset. For example, similarities between the new forecast and the test dataset may be analyzed. In some embodiments, the closest value to the forecasted value may be the nearest neighbor. In some embodiments, the forecast may include multiple components of weather information, and similarities between some or all of the components may be considered, and some components may be weighted more heavily than others. In these and other embodiments, the new forecast may be classified in a weather class based on the nearest neighbor. For example, the new forecast may be placed in the same weather class as the nearest neighbor. In these and other embodiments, a solar zenith angle of the new forecast may also be analyzed to determine whether the new forecast has a high solar zenith angle. In these and other embodiments, if the new forecast has a low solar zenith angle, the new forecast may be considered as projecting After the new forecast has been classified in a weather class, the new forecast may be analyzed to determine the accuracy of the new forecast, or the degree of unpredictability of the new forecast. For example, confidence intervals for the new forecast may be determined based on characteristics of the weather class to which the new forecast belongs, or based on characteristics of the nearest neighbor of the new forecast. For example, the control device 111 may determine a degree of unpredictability and/or confidence intervals for the new forecast.

In some embodiments, after the control device 111 has analyzed the new forecast, the control device 111 may alter the operation of the VPP 110 based on the accuracy of the new forecast. For example, the control device 111 may send a message to the solar power generating device 112, the wind power generating device 113, the fossil fuel power generating device 114, and/or the hydro power generating device 115 to increase or decrease output of power generation. For example, the control device 111 may instruct the solar power generating device 112 to increase output and may instruct any of the non-solar power generating devices (e.g., the wind power generating device 113, the fossil fuel power generating device 114, and/or the hydro power generating device 115) to decrease output. In these and other embodiments, the modification may be proportional to an output of the analysis, such as the confidence intervals of the new forecast. Additionally or alternatively, the control device 111 may purchase or acquire additional electrical power or provisionally purchase or acquire additional electrical power from the energy market 130 based on the analysis of the new forecast. Additionally or alternatively, the control device 111 may set, modify, alter, reduce, and/or increase the price at which the VPP 110 is offering electrical power on the energy market 130 based on the analysis of the new forecast. For example, using the accuracy of the new forecast, the VPP 110 may be aware of the minimum solar energy production. Knowledge of the minimum energy production may instruct the control device 111 how much additional energy (besides solar energy) that will be needed in a worst case scenario. The control device 111 may acquire or make arrangements to acquire any additional energy through purchase or alternative power production.

The control device 111 may include one or more processors 116 (referred to as the processor 116), a memory 117, one or more storage devices 118 (referred to as the storage device 118), and one or more communication devices 119 (referred to as the communication device 119).

The processor 116 may include any suitable special-purpose or general-purpose computer, computing entity, or processing device including various computer hardware or software modules and may be configured to execute instructions stored on any applicable computer-readable storage media, such as the memory 117 and/or the storage device 118. For example, the processor 116 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, the processor 116 may include any number of processors configured to perform, individually or collectively, any number of operations described in the present disclosure. Additionally, one or more of the processors may be present on one or more different electronic devices, such as different devices coupled together or communicating remotely.

In some embodiments, the processor 116 may interpret and/or execute program instructions and/or process data stored in the memory 117. In some embodiments, the processor 116 may fetch program instructions from the storage device 118 and load the program instructions in the memory 117. After the program instructions are loaded into memory 117, the processor 116 may execute the program instructions. In some embodiments, the execution of instructions by the processor 116 may direct and/or control the operation of the VPP 110 and/or the control device 111. For example, the processor 116 may send a message from the control device 111 to one or more of the electrical power generating devices to increase or decrease electrical output.

The memory 117 and the storage device 118 may include computer-readable storage media for carrying or having computer-executable instructions or data structures stored thereon. Such computer-readable storage media may include any available media that may be accessed by a general-purpose or special-purpose computer, such as the processor 116. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), hard disk drives (HDD), solid state drives (SSD), or any other storage medium which may be used to carry or store desired program code in the form of computer-executable instructions or data structures and which may be accessed by a general-purpose or special-purpose computer. The computer-readable storage media may be configured as a stand-alone media or as part of some other system, component, or device. The computer-readable storage media may be configured as a physical media or as a virtualized media. Combinations of any of the above may also be included within the scope of computer-readable storage media. Computer-executable instructions may include, for example, instructions and data configured to cause the processor 116 to perform a certain operation or group of operations.

The communication device 119 may include any component, device, system, or combination thereof configured to transmit or receive information. The communication device 119 may communicate with other devices at other locations, the same location, or even other components within the same system. The communication device 119 may include, without limitation, a modem, a network card (wireless or wired), an infrared communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The communication device 119 may permit data to be exchanged with the network 140 and/or any other devices described in the present disclosure, including any of the power generating devices.

Modifications, additions, or omissions may be made to the system 100 without departing from the scope of the present disclosure. For example, in some embodiments, the system 100 may include any number of other components that may not be explicitly illustrated or described, such as a nuclear power generating device. As another example, the control device 111, while illustrated as a single device, may be any number of devices or systems communicatively coupled. For example, certain of the tasks performed by the control device 111 may be performed by a server, cloud-based service, or any other remote device, and may be invoked by a client using a web-browser, portable device, etc.

Figure 3:
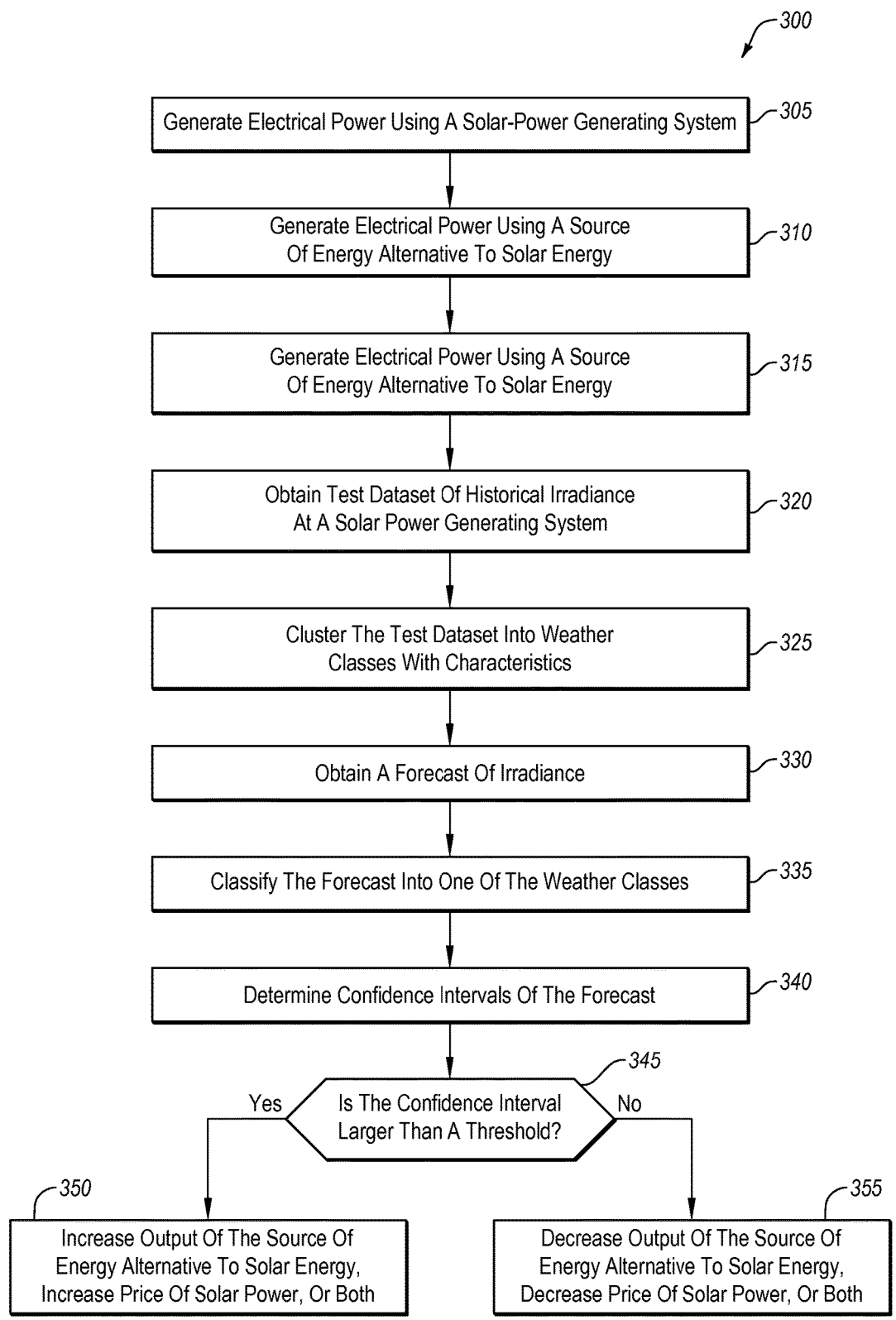
FIG. 3 is flow diagram of an example method of operating a solar power generating system.

FIG. 3 is an example flow diagram of a method 300 of operating a solar power generating system, in accordance with at least one embodiment of the present disclosure. The method 300 may be performed by any suitable system, apparatus, or device. For example, the system 100, the VPP 110, or the control device 111 of FIG. 1 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

At block 305, a solar power generating system may be used to generate electrical power. Such a power generating system may include a VPP (such as the VPP 110 of FIG. 1), or may be any other system with a solar power generating device.

At block 310, a source of energy alternative to solar power may be used to generate electrical power. Such a source of energy may be part of the VPP or may be some other power generating device. Examples of such sources of energy may include wind, nuclear, fossil fuel (e.g., coal, natural gas), or hydro power generating devices.

At block 315, a test dataset of historical irradiance data at the location of the solar power generating system may be obtained. For example, a weather information source (e.g., the weather information source 120 of FIG. 1) may transmit historical data to the solar power generating system. As another example, the solar power generating system may generate, gather, or record the historical irradiance data. For example, a control device (e.g. the control device 111 of FIG. 1) may utilize sensors to measure local weather at the solar power generating system over time to generate the historical irradiance data. In some embodiments, the test dataset may include additional weather information in addition to irradiance data.

At block 320, the test dataset may be normalized based on a clear sky model of irradiance at the location of the solar power generating system. For example, each historical data point in the test dataset at a given time of day may have the irradiance divided by the typical irradiance during a clear sky at that time of day. Such a normalized test dataset may be independent of the time of day considered or independent of the solar zenith angle. The control device may perform such a normalization.

At block 325, the test dataset may be clustered into weather classes, each weather class having a set of corresponding characteristics. For example, a histogram of the normalized test dataset may be generated based on the probability that a given clear sky index would occur in the test dataset. The histogram may have a curve fit to the data, and then a curve for each weather class may be derived from the curve fit to the histogram. Each data point in the test dataset may be clustered into a weather class based on how closely a given data point fits to the curve associated with a particular weather class. As another example, multiple characteristics may be considered, and each data point may be classified based on an analysis of similarities of the data point with multiple characteristics of the set of characteristics of a given weather class. Additionally or alternatively, the characteristics may be weighted in a non-uniform way such that one or more characteristics may have a predominant effect on whether a given data point in the test dataset is clustered into a given weather class. The control device may perform such a clustering.

At block 330, a forecast of irradiance may be obtained. For example, the forecast may be transmitted from the weather information source to the solar power generating system. Additionally or alternatively, the solar power generating system may generate the forecast of irradiance. In some embodiments, the forecast may also include other components of weather information in addition to irradiance.

At block 335, the forecast may be classified into one of the weather classes. For example, a nearest neighbor of the forecast may be identified and, based on the nearest neighbor, the forecast may be classified into one of the weather classes. In some embodiments, such classification may include comparing and/or analyzing one or more characteristics of the forecast with characteristics of the nearest neighbor and/or weather classes. The control device may perform such a classification.

At block 340, confidence intervals of the forecast may be determined. Such a determination may be based on the weather class to which the forecast is classified, and may be based on one or more of the characteristics of the weather class, such as the degree of unpredictability of the weather class, the probability distribution of the weather class, and/or any other characteristics of the weather class. The determination of confidence intervals may also be based on one or more characteristics and/or the weather class of the nearest neighbor of the forecast. The control device may perform such a determination.

At block 345, a determination may be made whether the confidence interval is larger than a threshold value. Such a determination may be made by a control device. At block 350, after a determination that the confidence interval is larger than the threshold, the operation of the solar power generating system may be modified. For example, the output of the source of energy that is alternative to solar power may be increased, or the price of solar energy charged by the solar power generating system may be increased, or both. Additionally or alternatively, output of the solar power generating device may be decreased. Such a modification may occur, for example, by the control device sending a message to the source of energy that is alternative to solar power, sending a message to the solar power generating system, or sending a message to an energy market (e.g., the energy market 130 of FIG. 1).

At block 355, after a determination that the confidence interval is not larger than the threshold, operation of the solar power generating system may be modified. For example, the output of the source of energy that is alternative to solar power may be decreased, or the price of solar energy charged by the solar power generating system may be decreased, or both. Additionally or alternatively, output of the solar power generating device may be increased. Such a modification may occur, for example, by the control device sending a message to the source of energy that is alternative to solar power, sending a message to the solar power generating system, or sending a message to the energy market.

Accordingly, the method 300 may be used to operate a solar power generating system. Modifications, additions, or omissions may be made to the method 300 without departing from the scope of the present disclosure. For example, any of the blocks 305 or 310 may be omitted. As another example, the operations of the method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the present disclosure.

Figure 4A:
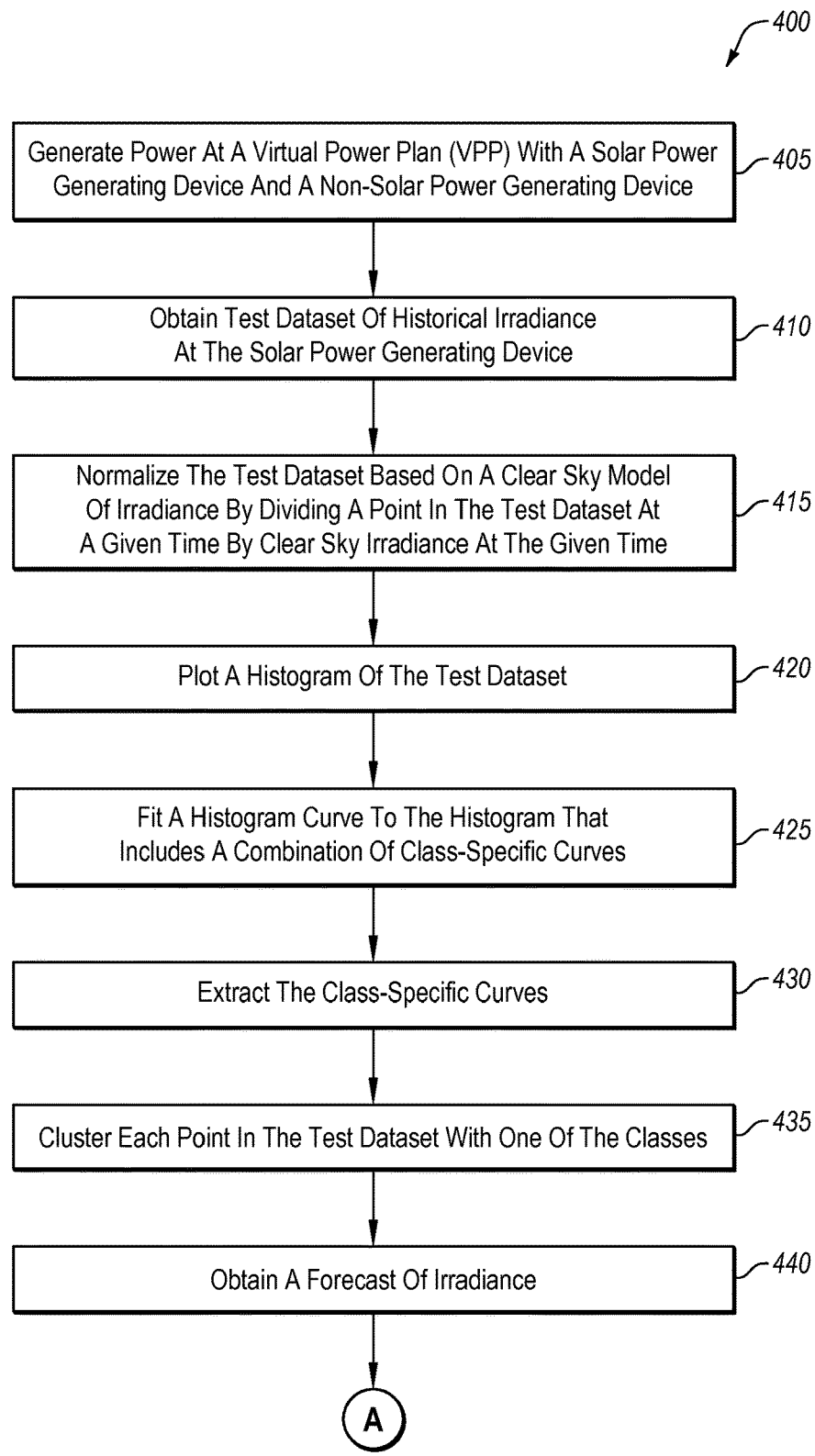
FIGS. 4A and 4B are a flow diagram of an example method of operating a virtual power plant including a solar power generating device.
Figure 4B:
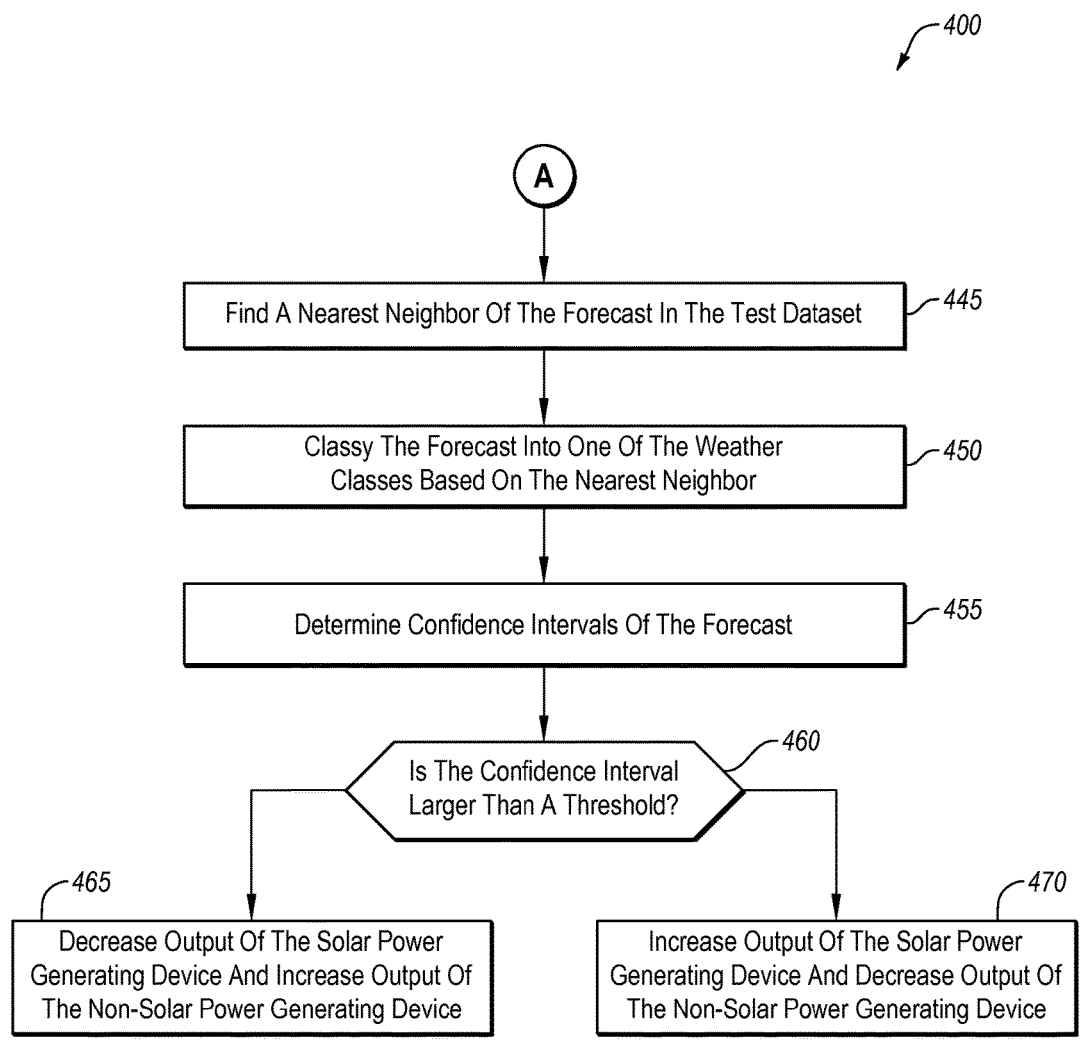

FIGS. 4A and 4B are an example flow diagram of a method 400 of operating a virtual power plant including a solar power generating device, in accordance with at least one embodiment of the present disclosure. The method 400 may be performed by any suitable system, apparatus, or device. For example, the system 100, the VPP 110 or the control device 111 of FIG. 1 may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

At block 405, a VPP (e.g., the VPP 110 of FIG. 1) with a solar power generating device (e.g., the solar power generating device 112 of FIG. 1) and at least one non-solar power generating device (e.g., any one of the wind power generating device 113, the fossil fuel power generating device 114, or the hydro power generating device 115 of FIG. 1) may be used to generate electrical power.

At block 410, a test dataset of historical irradiance data at the location of the solar power generating device may be obtained. The block 410 may be similar to the block 315 of FIG. 3.

At block 415, the test dataset may be normalized based on a clear sky model of irradiance at the location of the solar power generating device. Such normalization may include dividing the irradiance of a data point at a given time of day by the typical irradiance during a clear sky at a given time of day for each historical data point in the test dataset. Such normalization may be performed by a control device (e.g., the control device 111 of FIG. 1).

At block 420, a histogram of the test dataset may be plotted. For example, a plot such as the plot 210 of the example set of plots 200 of FIG. 2 may be generated based on the normalized test dataset. Such plotting may be performed by the control device.

At block 430, a histogram curve may be fitted to the histogram. An example of such a curve may include the curve 225 of the plot 220 of FIG. 2. The histogram curve may include a combination curve that includes the combination of class-specific curves. For example, there may be a curve corresponding to each of multiple weather classes to which the test dataset may be clustered. Examples of such classes may include overcast, partly cloudy, or clear. An example of such curves may include the first, second, and third curves 232, 234, and 236 of the plot 230 of FIG. 2. Such fitting may be performed by the control device.

At block 435, the data points in the test dataset may be clustered into one of the classes. In some embodiments, each of the classes may include a corresponding set of characteristics. In these and other embodiments, each data point in the test dataset may be clustered into a weather class based on how closely a given data point fits to the curve associated with a particular weather class. As another example, multiple characteristics may be considered, and each data point may be classified based on an analysis of similarities of the data point with multiple characteristics of the set of characteristics of a given weather class. Additionally or alternatively, the characteristics may be weighted in a non-uniform way such that one or more characteristics may have a predominant effect on whether a given data point in the test dataset is clustered into a given weather class. The control device may perform such a clustering.

At block 440, a forecast of irradiance may be obtained. The block 440 may be similar to the block 330 of FIG. 3.

At block 445 (illustrated in FIG. 4B), a nearest neighbor of the forecast in the test dataset may be found. For example, the control device may find the data point in the test dataset that is most similar to the forecast. Such a finding may include consideration of multiple characteristics of the forecast and the data points in the test dataset. In some embodiments, one or more of the characteristics may be weighted more or less than other characteristics in finding the nearest neighbor of the forecast.

At block 450, the forecast may be classified into one of the weather classes based on the nearest neighbor. For example, the forecast may be placed in the same weather class as the nearest neighbor. Additionally or alternatively, a subset of weather classes may be selected based on the nearest neighbor and the characteristics of each of the subset of weather classes may be compared to the characteristics of the forecast. The classification may be performed by the control device.

At block 455, a confidence interval of the forecast may be determined. The block 455 may be similar to the block 340 of FIG. 3. At block 460, a determination may be made as to whether the confidence interval is larger than a threshold. The block 460 may be similar to the block 345 of FIG. 3.

At block 465, after a determination that the confidence interval is larger than the threshold, operation of the VPP may be modified. For example, the output of the solar power generating device may be decreased and the output of the non-solar power generating device may be increased. In some embodiments, such an increase and/or decrease may be proportional to the confidence interval.

At block 470, after a determination that the confidence interval is not larger than the threshold, operation of the VPP may be modified. For example, the output of the solar power generating device may be increased and the output of the non-solar power generating device may be decreased. In some embodiments, such an increase and/or decrease may be proportional to the confidence interval.

Accordingly, the method 400 may be used to operate a VPP that includes a solar power generating device. Modifications, additions, or omissions may be made to the method 400 without departing from the scope of the present disclosure. For example, the block 405 may be omitted. As another example, the operations of the method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the present disclosure.

By way of example, certain aspects of at least one embodiment of the present disclosure may be described with reference to equations and/or mathematical operations. For example, the analysis to describe the future probability distribution of solar power from historical data may be described as $$P(y_{t+h} - \hat{y}_{t+h} | x_t)$$

where $y_{t+h}$ may represent the true forecast value at t+h; $\hat{y}_{t+h}$ may represent a forecast at t+h; $x_t = (Y_t, Z_{t+h})$, where $h = \{1, \ldots, H\}$; and $Y_t = \{y_1, \ldots, y_t\}$ may be a vector of analog observations prior to and including time t; and $Z_{t+h} = \{z_1, \ldots, z_t, z_{t+h}\}$ may be a vector of analog exogenous variables prior to and including time t+h; and for n number of weather information variables, $z_i \in R^n$ where $i = 1, \ldots, t+h$.

In some embodiments, normalization of a test dataset may be represented by example mathematical operations. For example, for clear-sky index (kt), the clear-sky index may be normalized by $$y_t = kt_{(t)} = \frac{I_{(t)}}{I_{(t)}^{clr}}$$

where $I_{(t)}$ may be the solar irradiance (e.g., either the global irradiance or the normal irradiance) and $I_t^{clr}$ may be the clear-sky irradiance model for the given time, and the operation may be performed for each point in time for the historical data of the test dataset.

In some embodiments, various aspects of plotting a histogram and/or clustering the test dataset into multiple classes may be represented by mathematical operations. For example, to determine sky cover based on the clear-sky index, a function $f$ may be introduced $$kt_{(t)} = f(\text{sky cover}_1, \ldots, \text{sky cover}_t)$$

and a function g may be utilized for plotting the probability density function of the clear sky index values.

$$\text{sky cover}_{(t)} = f^{-1}(kt_{(t)}) = g_t(kt_{(t)})$$

As another example, each class may be modeled by a Gaussian distribution model, described by $$g_t = \alpha_1 N_1 + \ldots + \alpha_p N_p$$

where $g_t$ may represent the combined curve (e.g. the curve 225 of the plot 220 of FIG. 2) and $\alpha_1 N_1 + \ldots + \alpha_p N_p$ may represent the various Gaussian distribution models contributing to the combined curve, with $\alpha$ indicating the probability of a given weather class and N representing one of the Gaussian distribution curves of a given weather class in the combined curve, and p representing the number of classes. In some embodiments, data points with a low solar zenith angle may be excluded. In some embodiments, expectation maximization may be used to find a correct class for each data point in the test data set, for example, using the equation $$P(Q_i | y) = \frac{P(y | Q_i) \, P | Q_i}{P(y)}$$

where $Q_i$, represents the $i^{th}$ weather class (e.g., the $i^{th}$ class derived from the histogram). For example, if using the classes of overcast, partly cloudy, and clear, i may iteratively cycle through each of the classes. To facilitate determination of the various $\alpha$ values, $P(Q_i)=\alpha_i$, and $\alpha_1+\ldots+\alpha_p=1$, where $P(Q_i)$ may be derived by $$P(y \mid Q = Q_i) = f(y \mid N(\mu_i, \sigma_i)) = \frac{1}{\sigma_i \sqrt{2\pi}} e^{-\frac{(y-\mu_i)^2}{\sigma_i^2}}$$

Thus, using these mathematical operations, each curve for each of the weather classes may be extracted from the combined curve.

In some embodiments, finding the nearest neighbor may utilize a k-nearest neighbor (k-NN) algorithm to find the nearest neighbor, and may utilized a general pattern search algorithm for weighted distances to the nearest neighbor. For example, the test dataset for analyzing a new forecast may be represented by the equation $$S=(z_t,s_t) \in R^{mn} \times \{1,\ldots,p\}$$

where S may represent the space of the test dataset, $s_t$ may represent the label of the new forecast point $z_t$ in the dataset, and m may represent the number of points in the test dataset. Utilizing the test dataset, a prediction may be made as to the probability the forecast belongs in a given weather class using the equation:

$$P(y = \Gamma_k(S, z_t) \mid z_t, s_t, k) = \frac{1}{k} \sum_{(z_t,s_t) \in S} 1(\Gamma_k(N_k(z_t, S) = s_t))$$

where $\Gamma_k(S, z_t)$ may represent the prediction made on $z_t$ using its k number of nearest neighbors in the space S, and where $N_k(z_t, S)$ are the indices of the k nearest points to $z_t$ in the space S, and 1(e) is an indicator function in which $$1(e) = \begin{cases} 1 \text{ if } e \text{ is ture} \\ 0 \text{ if } e \text{ is false} \end{cases}$$

In these and other embodiments, the similarity criteria for the nearest neighbors may be based on weighted distance functions calculated using the general pattern search algorithm, which may function according to the equation:

$$\|z_i - z_j\| = \sqrt{\sum_{l=1}^{n} w_l \|z_{l,i} - z_{l,j}\|^2}$$

where w is the weighting function and $$\sum_{i=1}^{n} w_i = 1$$

In some embodiments, after a forecast has been classified in a given class, a Kriging model may be used to determine the error distribution or the confidence intervals of the forecast. Such an analysis may be characterized as mathematical equations and/or operations. For example, a predictor of the error $e_{t+h}$ may be characterized by the equations:

$$\hat{e}_{t+h} = \mathbb{E}[e_{t+h} \mid x_t = (\Delta Y_t, Z_{t+h})]$$

$$\hat{e}_{t+h} = 1 \cdot \hat{\mu}_h(z_{t+h}) + r_{s_p}(z_{t+h}, z_{t_p})^T R_{s_p}(Z_{t,s_p}, Z_{t,s_p})^{-1} (\Delta Y_{t,s_p} - 1 \cdot \hat{\mu}_h(z_{t+h}))$$

where $\Delta Y_{t,s_p}$ may represent the forecast error history at the class $s_p$, $R_{s_p}(Z_{t,s_p}(i), Z_{t,s_p}(j))$ may represent the correlation model between $\Delta Y_{t,s_p}(i)$ and $\Delta Y_{t,s_p}(j)$, and $r_{s_p}(z_{t+h}, z_{t_p})$ may be a vector of correlation between $\hat{e}_{t+h}$ and $\Delta Y_{t,s_p}(i)$, and $$\hat{\mu}_h(z_{t+h}) = \frac{1^T R_{s_p}(Z_{t,s_p}, Z_{t,s_p})^{-1} \Delta Y_{t,s_p}}{1^T R_{s_p}(Z_{t,s_p}, Z_{t,s_p})^{-1} 1}$$

$$\hat{\sigma}^2_{s_p}(z_{t+h}) = \frac{(1 \cdot \hat{\mu}_h(z_{t+h}) - \Delta Y_{t,s_p})^T R_{s_p}(Z_{t,s_p}, Z_{t,s_p}; \theta)^{-1} (1 \cdot \hat{\mu}_h(z_{t+h}) - \Delta Y_{t,s_p})}{m}$$

$$R_{s_p}(Z_{t,s_p}(i), Z_{t,s_p}(j); \theta) = \exp\left(-\sum_{l=1}^{n} \theta_l (z_{il} - z_{jl})^{q_l}\right)$$

In some embodiments, a modified Cholesky decomposition may be used for the correlation matrix $R_{s_p}(\theta) = C_{s_p}(\theta) C_{s_p}'(\theta)$ with q set at 1. For the value of $\theta$, the optimal value may be maximized using log-likelihood using a pattern search algorithm, for example, using the equation:

$$J_{s_p}(z_{t+h}; \theta) = \frac{-(m \log \hat{\sigma}^2_{s_p}(z_{t+h}) + \log|R_{s_p}(Z_{t,s_p}, Z_{t,s_p}; \theta)|)}{2}$$

or minimized using the equation:

$$J_{s_p}(z_{t+h}; \theta) = \hat{\sigma}_{s_p}^2(z_{t+h}) det(C(\theta))^{2/m}$$

where $$\hat{\sigma}^2_{s_p}(z_{t+h}) = \frac{(1 \cdot \hat{\mu}_h(z_{t+h}) - \Delta Y_{t,s_p})^T R_{s_p}(Z_{t,s_p}, Z_{t,s_p}; \theta)^{-1} (1 \cdot \hat{\mu}_h(z_{t+h}) - \Delta Y_{t,s_p})}{m}$$

Using these values, a prediction for the error forecast $\hat{e}_{t+h}$ and MSE may be calculated as $$MSE(\hat{e}_t) = \mathbb{E}[(\hat{e}_t - e_t)^2]$$
$$= \mathbb{E}[(\hat{e}_t - \mathbb{E}[\hat{e}_t])^2] + (\mathbb{E}(\hat{e}_t - e_t))^2$$
$$= Var(\hat{e}_t) + Bias(\hat{e}_t, e_t)^2$$

where the probability distribution of the forecast error may be computed as $$e_{t+h} = y_{t+h} - \hat{y}_{y+H}$$

$$\hat{e}_{t+h} = N(\mu_h, \sigma_h)$$

$$y_{t+h} = \hat{y}_{t+h} + N(\mu_h, \sigma_h)$$

where $e_{t+h}$ may represent the real value for error, $\hat{e}y_{t+h}$ may represent the error distribution calculated in accordance with the present disclosure, Using these calculations, the expected value and variance of the error for the forecast may be determined, for example, by the equations $$\sigma_h = \sqrt{MSE(\hat{e}_{t+h}) - \text{Bias}(\hat{e}_{t+h}, e_{t+h})^2}$$

$$\mu_h = \hat{e}_{t+H}$$

$$y_{t+h} = \hat{y}_{t+h} + N(\mu_h, \sigma_h) y_{t+h} = \hat{y}_{t+h} + \hat{e}_{t+h}$$

where $\mu_h$ may represent the mean value of error, and $\sigma_h$ may represent variance associated with the error, and a distribution of error, $\hat{e}_{t+h}$ may be obtained.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases one or more or at least one and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of evaluating solar energy forecasts, the method comprising:
    generating power at a virtual power plant, the virtual power plant including at least one solar power generating device;
    obtaining a test dataset of historical irradiance at a location of the solar power generating device;
    normalizing the test dataset by dividing a point in the test dataset at a given time by a clear sky irradiance at the given time;
    plotting a histogram of the test dataset;
    fitting a curve to the histogram, the curve including a combination of class-specific curves for each of a plurality of classes;
    extracting the class-specific curves for each of the classes;
    clustering each point in the test dataset with one of the classes based on how closely each point fits to the class-specific curves;
    obtaining a forecast of irradiance for a time at the solar power generating device;
    finding a nearest neighbor of the forecast in the test dataset based on similarities between the forecast and the test dataset, the nearest neighbor including a point in the test dataset with similar weather conditions to the forecast;
    based on the nearest neighbor of the forecast, classifying the forecast into one of the plurality of classes to which the nearest neighbor belongs;
    determining confidence intervals of the forecast based on a degree of unpredictability of irradiance of the one of the plurality of classes; and
    based on the confidence intervals, modifying power production at the virtual power plant by performing one of increasing output or decreasing output of the solar power generating device based on the confidence intervals.

2. The method of claim 1, wherein the confidence intervals are determined using a Kriging model.

3. The method of claim 1, wherein the virtual power plant further includes at least one non-solar power generating device, and modifying the power production at the virtual power plant includes performing one of:
    increasing output of the solar power generating device and decreasing output of the non-solar power generating device proportional to the confidence intervals; and decreasing output of the solar power generating device and increasing output of the non-solar power generating device proportional to the confidence intervals.

4. The method of claim 1, wherein finding the nearest neighbor includes using a k-nearest neighbor algorithm based on weighted distances to neighbors, the weighted distances to neighbors determined using a general pattern search algorithm.

5. The method of claim 3, wherein the non-solar power generating device includes one or more of wind power device, a hydraulic power device, a coal power device, a nuclear power device, or a natural gas power device.

6. A method of analyzing solar power forecasts, the method comprising:
  obtaining a test dataset of historical irradiance at a location of a solar power generating system;
  normalizing the test dataset, the normalized dataset being independent of solar zenith angle;
  clustering the test dataset into a plurality of weather classes, each weather class including a set of characteristics;
  obtaining a forecast of irradiance for a given future time at the solar power generating system;
  classifying the forecast into one of the plurality of weather classes;
  determining confidence intervals of the forecast based on the set of characteristics of the one of the plurality of weather classes; and
  based on the confidence intervals of the forecast, performing one of increasing output of a source of energy alternative to solar energy or decreasing output of the source of energy.

7. The method of claim 6, wherein the set of characteristics includes an amount of cloud cover including at least one of a clear sky, an overcast sky, and a partly cloudy sky.

8. The method of claim 6, wherein
  the set of characteristics includes a degree of unpredictability of irradiance; and each of the plurality of weather classes has a different degree of unpredictability of irradiance.

9. The method of claim 6, wherein the set of characteristics includes one or more of season, location, cloud formation, cloud class, or sky cover.

10. The method of claim 6, wherein the forecast of irradiance is generated by a third party.

11. The method of claim 6, further comprising:
  generating electrical power using the solar power generating system; and
  generating electrical power using the source of energy.

12. The method of claim 6, wherein the source of energy includes one or more of wind power, hydraulic power, coal power, nuclear power, or natural gas power.

13. The method of claim 6, wherein normalizing the test dataset includes dividing a point in the test dataset at a given time by a clear sky irradiance at the given time.

14. The method of claim 6, wherein clustering the test dataset into a plurality of weather classes comprises:
  plotting a histogram of the test dataset;
  fitting a curve to the histogram, the curve including a combination of class-specific curves for each class;
  extracting the class-specific curves for each of the classes; and
  associating each point in the test dataset with one of the classes based on how closely each point fits to the class-specific curves.

15. The method of claim 6, wherein
  classifying the forecast into one of the plurality of weather classes comprises finding a nearest neighbor value of the forecast, the nearest neighbor value representing a point in the test dataset with similar weather conditions to the forecast; and
  determining confidence intervals of the forecast is further based on a degree of unpredictability of irradiance of a class to which the nearest neighbor value belongs.

16. The method of claim 15, wherein the nearest neighbor includes a different time of day than the forecast.

17. The method of claim 6, wherein the solar power generating system comprises a plurality of individual power generating devices, including at least one solar power generating device, aggregated as a virtual power plant.

18. The method of claim 6, further comprising modifying a price of the solar power based on the confidence intervals.

* * * * *